(12) United States Patent
Moisy et al.

(10) Patent No.: US 12,631,311 B2
(45) Date of Patent: May 19, 2026

(54) SYSTEM FOR PROJECTING MULTIPLE LIGHT BEAMS

(71) Applicant: VALEO VISION, Bobigny (FR)

(72) Inventors: Eric Moisy, Unterföhring (DE);
Marine Courcier, Unterföhring (DE);
Stefan Namyslo, Unterföhring (DE)

(73) Assignee: Valeo Vision, Bobigny (FR)

( * ) Notice: Subject to any disclaimer, the term of this patent is extended or adjusted under 35 U.S.C. 154(b) by 16 days.

(21) Appl. No.: 18/701,401

(22) PCT Filed: Oct. 17, 2022

(86) PCT No.: PCT/EP2022/078887
§ 371 (c)(1),
(2) Date: Apr. 15, 2024

(87) PCT Pub. No.: WO2023/062249
PCT Pub. Date: Apr. 20, 2023

(65) Prior Publication Data
US 2024/0344681 A1 Oct. 17, 2024

(30) Foreign Application Priority Data
Oct. 15, 2021 (FR) ...................................... 2110969

(51) Int. Cl.
F21S 43/40 (2018.01)
B60Q 1/34 (2006.01)
(Continued)

(52) U.S. Cl.
CPC ................ F21S 43/40 (2018.01); B60Q 1/34 (2013.01); B60Q 1/38 (2013.01); B60Q 1/381 (2022.05);
(Continued)

(58) Field of Classification Search
CPC .......... F21S 43/40; F21S 43/237; F21S 43/14; F21S 43/2621; F21W 2103/60;
(Continued)

(56) References Cited

U.S. PATENT DOCUMENTS 9,889,792 B2 2/2018 Son et al.
9,931,977 B2 4/2018 Youn et al.
(Continued)

FOREIGN PATENT DOCUMENTS

EP 3178699 A1 6/2017
EP 3517829 A1 7/2019
(Continued)

OTHER PUBLICATIONS

Machine translate of JP2012025261A (Feb. 9, 2012) (Year: 2012).*
(Continued)

*Primary Examiner* — Laura K Tso
(74) *Attorney, Agent, or Firm* — Valeo Vision

(57) ABSTRACT

The invention relates to a system for projecting light beams for a vehicle, including a first device configured to generate a first beam which performs a signaling function and a second device configured to generate at least a second beam for projecting a pattern, with the first device including at least one refractive optical member for shaping the first beam and in that the second device includes at least one optical element having a controlled pattern-generating surface to deflect light rays from a light source, this generating surface having local variations arranged so as to form a predetermined pattern in the second beam.

11 Claims, 11 Drawing Sheets

(51) Int. Cl.

| | |
|---|---|
| *B60Q 1/38* | (2006.01) |
| *B60Q 1/44* | (2006.01) |
| *B60Q 1/46* | (2006.01) |
| *B60Q 1/48* | (2006.01) |
| *F21S 43/14* | (2018.01) |
| *F21S 43/20* | (2018.01) |
| *F21S 43/237* | (2018.01) |
| *F21W 103/20* | (2018.01) |
| *F21W 103/30* | (2018.01) |
| *F21W 103/35* | (2018.01) |
| *F21W 103/45* | (2018.01) |
| *F21W 103/60* | (2018.01) |

(52) U.S. Cl.
CPC ................. *B60Q 1/44* (2013.01); *B60Q 1/46* (2013.01); *B60Q 1/48* (2013.01); *F21S 43/14* (2018.01); *F21S 43/237* (2018.01); *F21S 43/2621* (2024.05); *F21W 2103/20* (2018.01); *F21W 2103/30* (2018.01); *F21W 2103/35* (2018.01); *F21W 2103/45* (2018.01); *F21W 2103/60* (2018.01)

(58) Field of Classification Search
CPC ........... F21W 2103/30; F21W 2103/35; F21W 2103/20; F21W 2103/45; B60Q 1/34; B60Q 1/38; B60Q 1/44; B60Q 1/46; B60Q 1/48; B60Q 1/381
USPC ......................................................... 362/509
See application file for complete search history.

(56) References Cited

U.S. PATENT DOCUMENTS

| 10,040,392 B2 * | 8/2018 | Salter .................... B60Q 1/381 |
|---|---|---|
| 10,676,019 B2 | 6/2020 | Chen et al. |
| 10,829,036 B2 | 11/2020 | Sugiyama et al. |
| 11,079,072 B2 | 8/2021 | Le Corre et al. |
| 2005/0117364 A1 * | 6/2005 | Rennick ................. B60Q 9/008 |
| | | 362/540 |
| 2017/0166111 A1 * | 6/2017 | Baccarin ................. F21S 43/13 |
| 2017/0259731 A1 * | 9/2017 | Son .......................... B60Q 1/48 |
| 2019/0234585 A1 * | 8/2019 | Le Corre ............... F21S 43/33 |
| 2019/0322209 A1 * | 10/2019 | Sugiyama .............. F21S 43/26 |
| 2023/0003355 A1 * | 1/2023 | Kanezuka .............. F21S 41/33 |
| 2024/0059214 A1 * | 2/2024 | Suzuki ................... F21S 43/14 |

FOREIGN PATENT DOCUMENTS

| JP | 2012025261 A | 2/2012 | |
|---|---|---|---|
| JP | 2019160770 A | 9/2019 | |
| WO | WO-2021018808 A1 * | 2/2021 | ............. F21S 43/26 |
| WO | 2021117677 A1 | 6/2021 | |

OTHER PUBLICATIONS

European Patent Office, International Search Report (with English translation) and Written Opinion of corresponding International Application No. PCT/EP2022/78887, dated Feb. 14, 2023.

Yonghao Yue, et al., Poisson-Based Continuous Surface Generation for Goal-Based Caustics, ACM Transactions on Graphics, vol. 31, No. 3, Article 31 (May 2014).

Yuliy Schwartzburg, et al., High-contrast Computational Caustic Design, ACM Transactions on Graphics (Proceedings of ACM SIGGRAPH 2014), vol. 33, Issue 4, Article No. 74 (Jul. 2014).

Japan Patent Office, Office Action (and English translation) of corresponding Japanese Patent Application No. 2024-522257, dated Apr. 30, 2025, 14 pages.

* cited by examiner

A-A

B-B

A-A

A-A

A-A

A-A

A-A

A-A

A-A

A-A

A-A

A-A

E4

E5

SYSTEM FOR PROJECTING MULTIPLE LIGHT BEAMS

TECHNICAL FIELD

The present invention relates to the field of luminous devices, particularly for the automotive vehicle industry. It finds particularly advantageous application in the field of the generation of light beams for producing a signal, such as an indication of a change in the direction of movement of a vehicle, an actuation of hazard warning lights, an indication of a situation of reverse travel or an indication of braking, notably in the stop lights at the rear of the vehicle.

The invention is also intended to produce one or more patterns to be projected on to a surface, and typically on to a portion of the ground surrounding the vehicle.

BACKGROUND OF THE INVENTION

The signaling of particular situations of vehicles is crucial for a vehicle driver, but more especially for individuals located in his environment, notably pedestrians, cyclists or drivers of nearby vehicles. Such particular situations arise, for example, in the case of changes of direction, hazard situations, reversing or braking.

To enhance the visual indication of a change of direction, the publication entitled US Patent 2017/151904 A1 proposes to associate the emission of a conventional signal beam, particularly of the flashing type, with the projection of a second beam for creating a pattern on the ground to provide further information about the change of direction. For this purpose, this prior art uses a complex reflection system associated with light sources to produce the two beams.

A non-limiting aim of the present invention is to propose a less complex alternative for creating a system configured to produce two beams of the aforementioned type.

The other aims, features and advantages of the present invention will become apparent upon reviewing the following description and the accompanying drawings. It is understood that other advantages can be incorporated.

SUMMARY OF THE INVENTION

In order to achieve this objective, according to one embodiment, a light beam projection system for a vehicle is proposed, comprising a first device configured to generate a first beam having a signaling function and a second device configured to generate at least a second beam for projecting a pattern on the ground, preferably in an area close to the vehicle, at a distance of less than 5 meters from the vehicle.

Advantageously, the first device comprises at least one refractive optical member for shaping the first beam, and the second device comprises at least one optical element having a controlled pattern-generating surface configured to deflect light rays from a light source, this generating surface having local variations arranged so as to form a predetermined pattern in the second beam.

The controlled pattern-generating surface is a free-form surface, by contrast with the specified optical surfaces normally used in the field of automotive vehicle lighting and signaling, such normal surfaces being of the cylindrical, parabolic, elliptical or hyperbolic type, or consisting of combinations of these types. The controlled pattern-generating surface creates a correspondence between an object pattern on the generating surface and the target pattern projected on the ground. In the case of target patterns of simple shapes, for example solid geometrical shapes such as a disc, a rectangle, a triangle or a rhombus, the local variations will preferably be concentrated on the generating surface so as to provide a well-defined contour of the target pattern, and may advantageously form the contour of the object pattern. In the case of patterns of complex shape with very indented surfaces or numerous lines, or those combining a number of sectors (a line of rectangles, for example), the local variations will be distributed over the whole generating surface.

In particular, use is made of the original technology based on caustic generating surfaces for creating the pattern-generating surface and producing the desired patterns.

Caustics are a known optical phenomenon. They may be observed, for example, at the bottom of a sunlit swimming pool. There, they form fluctuating patterns that combine to form a mesh of lines of light that are more concentrated and therefore more luminous, with darker areas between the meshes. These lines and dark areas are due to the various fluctuations of the water surface. These fluctuations form local variations of orientation around the globally flat shape of the water surface. Thus, depending on the local variations encountered, the rays are deflected in different ways, some towards each other to form the more concentrated, and hence more luminous, lines, while others are deflected away from each other and form the dark areas. The mesh varies according to the agitation of the surface.

This arrangement offers a high degree of flexibility in terms of the practical implementation of the second device for generating the beam producing said pattern, also referred to here as the target pattern. This is because the generating surface may be positioned, for example, on a dioptric element or on the surface of a reflector.

The first device, for its part, comprises a refractive optical member for shaping the outgoing beam so as to calibrate it to the desired signaling function. Evidently, the first device may comprise other optical members for the preliminary or final shaping of the first beam.

The device is advantageously configured to emit the two beams simultaneously.

The pattern may preferably provide a piece of visual information complementary to that of the signaling function, that is to say by delivering a visual message whose logic is linked to a piece of information similar to that of the first beam (such as the indication on the ground of a wish to change direction, coupled with the generation of a first beam in the form of a flashing light).

The pattern(s) projected by the second beam are projected on a given surface outside the vehicle, typically on the ground; this surface, notably the surface on which the vehicle is moving, is usually a roadway.

According to one option, the first and second patterns are shared, in the sense that they share at least one common component. For example, an optical element of the dioptric (this term being taken to be synonymous with refractive) or reflective type may carry both the lens of the first device and the generating surface of the second device. Or, again, the light source may be common to both devices, providing a considerable cost reduction.

Furthermore, some or all of the components of the first device and of the second device may be separate. In this case, it is advantageous for separate components still to be mounted on the same support.

For example, the first device may comprise at least one dedicated light source, and the second device may comprise at least one other dedicated light source, but these sources may be carried by a common support member, for example a printed circuit board. According to another example, the first device may comprise at least one optical element, refractive or reflective, and the second device may comprise at least one other optical element, refractive or reflective, but these optical elements may be carried by a common support member, such as a mounting structure that fixes the optical elements in a headlamp unit.

Potentially, the system according to the invention may be very compact; for example, it may be fully integrated into a headlamp unit, in a similar configuration to existing devices that produce a signaling beam only.

Another aspect relates to a vehicle equipped with at least one system as indicated above.

BRIEF DESCRIPTION OF DRAWINGS

The aims, objects, features and advantages of the invention will become more clearly apparent from the detailed description of one embodiment of the latter, which embodiment is illustrated by the following accompanying drawings, in which.

Figure 1:
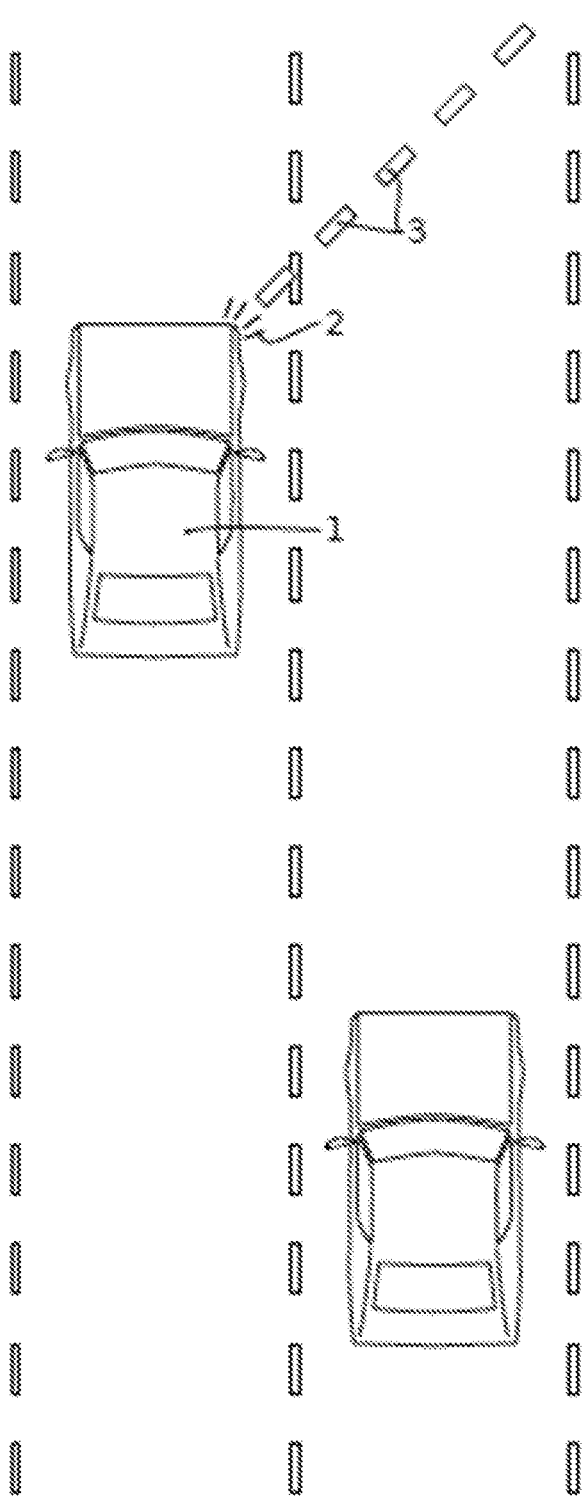
FIG. 1 shows, in a top view, a road situation in which a double visual indication of a change of direction is implemented.

The drawings are given by way of example and do not limit the invention. They are schematic conceptual depictions intended to facilitate understanding of the invention and are not necessarily drawn to the scale of practical applications.

DETAILED DESCRIPTION OF THE INVENTION

Before starting a detailed review of embodiments of the invention, optional features that may possibly be used in combination therewith or alternatively thereto will be described below:

The generating surface 12 is a reflective or refractive surface, extending in a given overall shape, and having local variations of shape around this given overall shape, these local variations being distributed over the whole of said generating surface 12 so that they provide the whole of the generating surface with a relief pattern forming an object pattern, these local variations being arranged so that most of said generating surface is smooth and so that, for a beam of rays incident on the whole of said generating surface 12, these rays having a given distribution, said generating surface 12 deflects the rays along different orientations according to the local variations that they encounter, thus forming a deflected beam propagating a propagated pattern identifiable over a working range extending upstream of and at least as far as a final given optimal propagation distance, this propagated pattern corresponding to a distorted projection of the object pattern, the optical element being arranged so that the propagated pattern is projected on a target surface which is visible from the outside of the luminous device and which is located within the working range and/or at a distance (D1, D2) that is substantially equal to said optimal distance.

The first device and the second device have at least one common light source 200.

The first device and the second device have at least one common optical element.

At least one common optical element comprises at least one common dioptric optical element.

The system according to the invention comprises a headlamp unit 4 in which the first device and the second device are housed, and in this system the at least one common dioptric optical element comprises an outer lens 6 sealing the headlamp unit 4.

At least one common dioptric optical element comprises a waveguide 25.

At least one common optical element comprises a reflector 22.

At least one common optical element comprises an optical element carrying the generating surface 12.

At least one common optical element comprises a dioptric optical element forming the refractive optical member for shaping the first beam 2.

The second device comprises a plurality of optical elements 10, each having a generating surface 12.

The optical elements 10, each having a generating surface 12, are spaced apart along a long dimension of the common optical element.

The signaling function is chosen from among a change of direction indication, a reversing indication, a braking indication and a hazard light indication.

The pattern comprises a plurality of portions spaced apart from each other.

If required, the system of the invention may have any of the following characteristics or any combinations thereof:

the first device comprises a refractive optical element and the second device comprises another refractive optical element, and these two refractive optical elements are separate and fixed to the same support and/or are contiguous;

the first device comprises a reflective optical element and the second device comprises another reflective optical element, and these two reflective optical elements are separate and fixed to the same support and/or are contiguous;

the first device comprises a reflective optical element and the second device comprises another, refractive, optical element, or the first device comprises a refractive optical element and the second device comprises another, reflective, optical element, and these two optical elements are separate and fixed to the same support;

the first device and the second device comprise a common dioptric optical element and the latter comprises a first area exclusively or mostly assigned for the path of the rays intended to form the first beam, and a second area exclusively or mostly assigned for the passage of the rays intended to form the second beam;

in the latter case, the dioptric optical element may have a cross section exhibiting a change of direction between these two areas;

the first device and the second device comprise an optical element in the form of a common reflector and the latter comprises a first area exclusively or mostly assigned for the path of the rays intended to form the first beam, and a second area exclusively or mostly assigned for the passage of the rays intended to form the second beam;

in the latter case, the reflector may have a cross section exhibiting a change of direction between these two areas;

if required, the second device uses all the components of the first device and the optical element is a part attached to an optical element of the first device.

As regards the generating surface, the following aspects may be implemented if required:

the given distribution is substantially such that, for any plane transverse to the direction of propagation, at a given point of this plane, the incident ray(s) (r1, r2, r3) at this point come from a single direction, and may correspond to that of a light-emitting diode;

the generating surface comprises at least one smooth portion whose surface represents most of the generating surface (12; 12'), the passage from one local variation to the other being smooth within this smooth portion; if required, the whole generating surface is smooth, the passage from one local variation to another being smooth; if required, the passage between some local variations is formed by an edge.

The terms "upstream" and "downstream" refer to the direction of propagation of the light rays in the luminous device and outside it. Unless indicated otherwise, the terms "forward", "backward", "lower", "upper", "side" and "transverse" refer to the direction of light emission from the luminous device, indicating a corresponding change of direction. In the features described below, terms relating to verticality, horizontality and transversality (or even the lateral direction), or equivalents thereof, are to be understood with respect to the position in which the lighting system is intended to be fitted in a vehicle. The terms "vertical" and "horizontal" are used in the present description to designate, regarding the term "vertical", a direction with an orientation perpendicular to the plane of the horizon (which corresponds to the height of the systems), and, regarding the term "horizontal", a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of the order of + or −10° is here considered to be a minor variation about the two preferred directions. With respect to the horizontal plane, the inclination is in principle between-5° and 4°, and it is between −6° and 7.5° laterally.

In the present invention, the target pattern forms a logo, a pictogram, a geometric pattern or a set of a plurality of logos, pictograms or geometric patterns and combinations thereof, such as for example a pictogram associated with one or more geometric patterns. Advantageously, a geometric pattern will be chosen of which the shape is well known, such as strips, chevrons, triangles or disks.

In the following text, the expressions "first device" and "second device" do not necessarily imply that these devices are entirely separate. On the contrary, it is advantageous for some members to be shared.

Embodiments of the system are described below, with particular reference to FIGS. 1 to 6D.

FIG. 1 provides an illustration, in a top view, of an example of application of the present invention. In the situation shown here, the vehicle 1, equipped with the system of the invention, is overtaking and is going to return to the right-hand lane. In this context, the driver has activated a change of direction signal light corresponding to the first beam 2, which advantageously has a standardized photometric parameter setting. At the same time, the visual indication produced by the first beam 2 is supplemented by the projection of a pattern 3 on the roadway by means of a system of the invention located on the front right-hand side of the vehicle 1.

This example is not exhaustive. Notably, an equivalent system is preferably fitted on the front left-hand side of the vehicle. The generation of the two beams proposed here can also be applied in other contexts, such as the projection of patterns and a reversing light beam, or the projection of patterns and a stop light beam.

Figure 2:
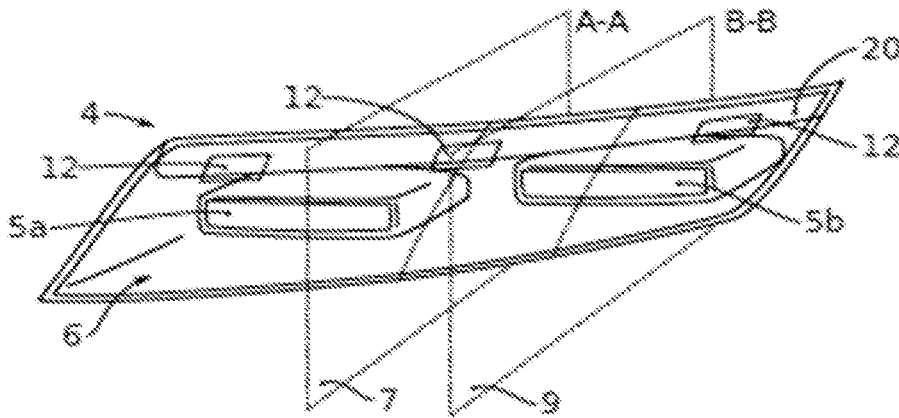
FIG. 2 shows a headlamp unit, in a face-on view, equipped with a system according to the invention, in one embodiment.
Figure 3A:
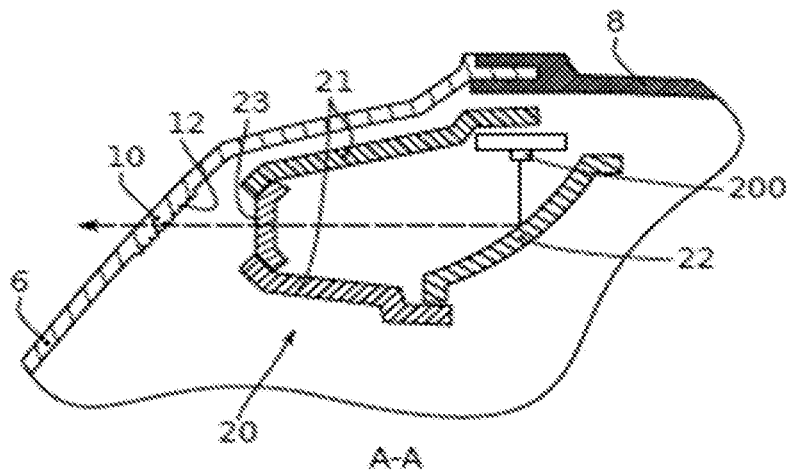
FIG. 3A shows a first sectional view of this embodiment, taken along the lines A-A of FIG. 2.

FIG. 2 shows an example of embodiment from the face of a headlamp unit 4 incorporating the system of the invention. The unit 4 may be made in a conventional manner with a rear part delimiting an inner volume of the unit 4 and an outer lens 6 sealing the face of the unit 4. FIG. 3A provides an example of interaction between the outer lens 6 and a rear part of the unit 4 in the form of a chassis 8. In the illustration of FIG. 2, the unit 4 comprises not only the system of the invention, but also two other light projection devices, corresponding to the references 5a and 5b. For example, these may be devices for providing luminous functions, such as low beam and/or high beam lights.

Figure 3B:
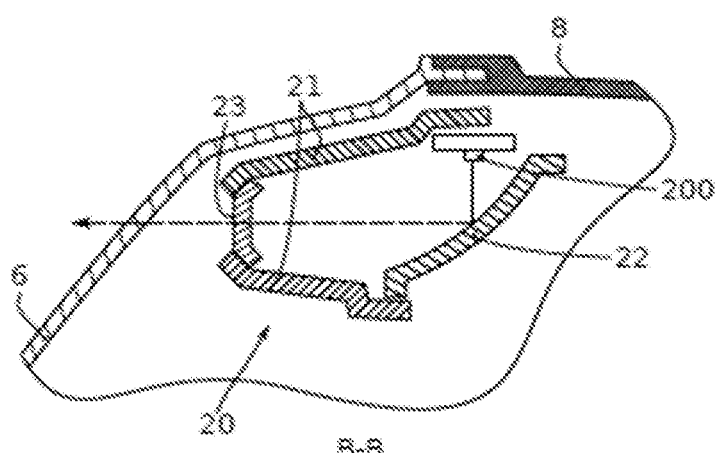
FIG. 3B shows a second sectional view of this embodiment, taken along the lines B-B of FIG. 2.

In the upper part of the headlamp unit 4, there is a luminous module 20, the structure of which is more clearly visible in FIGS. 3A and 3B. In this example, the luminous module 20 has a longitudinal extension along the width dimension of the unit 4. This makes it possible, for example, to give the first beam an elongate and flattened shape, this beam typically being a change of direction signaling beam for the front of the vehicle.

In the section shown in FIG. 3A, corresponding to the plane A-A referenced 7 in FIG. 2, the luminous module 20 comprises a light source 200 mounted on a support, which in this case has a flat support face.

In a manner known per se, the present invention may use light-emitting diodes (also commonly called LEDs) as light sources. These may potentially be one or more organic LEDs. These LEDs may in particular be provided with at least one chip using semiconductor technology and able to emit light. Moreover, the expression "light source" is here understood to mean a set of at least one elementary source such as an LED able to produce a flux leading to the generation of at least one of the light beams at the output of the system of the invention.

In this example, the rays emitted by the source 100 are directed toward a reflector 22 causing an angular deflection of the rays toward a lens 23 capable of forming the lens for shaping the first beam. In a non-limiting manner, FIG. 3A shows a vertical mean direction of emission from the source 100 and a deflection by the reflector 22 such that an outgoing beam with a horizontal axis is produced.

As indicated previously, the luminous module 20 may have an elongate shape, and for this purpose the reflector 22 may extend along the long dimension. Additionally, in order to produce a distribution of the light emission along the reflector 22, the luminous module 20 preferably comprises a plurality of light sources 200 spaced apart, preferably uniformly, along the long dimension.

However, the elongate shape of the luminous module 20 is not essential. It may, notably, have a long dimension that is shorter than the width of the headlamp unit. The headlamp unit may also be equipped with a plurality of luminous modules to form a plurality of first and second devices.

To delimit the luminous module 20 and screen the emission of the light toward the outer lens 6, masking walls 21 may form an envelope to delimit the inner volume of the luminous module 20.

In this example, as in the other following examples, a number of lens technologies for shaping the first beam may be used. Additionally, a plurality of optical elements, notably a plurality of lenses, may be used for this shaping. For example, a lens of the converging type, or one having a grating, such as a Fresnel lens, may be used to provide the desired shape for the first beam.

FIG. 3B is very similar to what is shown in the FIG. 3A. It is a section, referenced 9, taken along the direction B-B of FIG. 2. However, it should be noted that, at this point on the longitudinal dimension of the luminous module 20, the outer lens 6 has no relief patterns. On the contrary, in the section of FIG. 3A, the outer lens 6 has a pattern-generating surface 12, which is formed here, in a non-limiting manner, on the inner face of the outer lens 6. The dioptric element constituting the outer lens 6 forms the optical element 10 at this point on the surface 12, producing the second beam used for creating a pattern.

FIG. 2 also shows that a plurality of surfaces 12 are formed on the outer lens 6. Evidently, an optical element 10 is formed in each area corresponding to one of these surfaces 12, so that the system then comprises three second devices, each forming a second beam. In such a situation, three patterns 3 may be projected. If required, it may be arranged that one source 200 is situated facing each surface 12.

Thus the luminous module 20 and the outer lens 6 combine to form the first device and the second device. These devices have many components in common, including at least the light sources 200, the reflector 22 and the lens 23 in this example. In this context, the optical element 10 can be used to reshape part of the outgoing beam from the lens 23, so as to produce a second beam in a localized manner, the first beam being produced when the light emerges from the outer lens 6 outside the surface occupied by the element(s) 10.

Alternatives to the luminous module 20 are proposed in FIGS. 4A to 4D. As before, the luminous module 20 comprises masking walls 21. A lens 23 forms the exit diopter of the luminous module 20. However, the components for generating the light rays passing through the lens 23 are different.

Figure 4A:
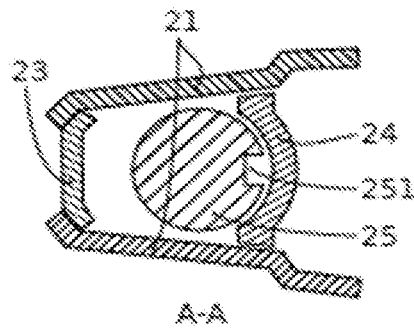
FIG. 4A, FIG. 4B, FIG. 4C and FIG. 4D show successively four variant embodiments of the system of FIGS. 3A and 3B.

In the case of FIG. 4A, these components comprise a waveguide 25. Like the preceding reflector 22, the guide 25 has a longitudinal dimension lying along the long dimension of the luminous module 20. Notably, the guide 25 may take the form of a bar, preferably of circular section. In the case shown here, the guide 25 has extraction surfaces 251, formed for example by notches running along the longitudinal dimension of the guide 25, located opposite the diopter for the exit of the rays from the guide 25 and acting as obstacles in the total internal reflection of the light in the guide 25, to cause an output of light from the guide 25 approximately along its length, toward the lens 23.

In this context, at least one light source 200 (not visible in FIG. 4A) is fitted in the system and is advantageously positioned at one of the ends of the guide 25, with a mean emission direction that preferably lies long the longitudinal direction of the guide 25. Optionally, another light source 200 is fitted, advantageously in a similar manner, on the other end of the guide 25, to improve the distribution of the light output.

In this example, a support 24 may be used to secure the guide 25 and potentially the light source(s).

Although the exit diopter of the guide 25 may carry out, or contribute to, the shaping of the first beam, a lens 23 is retained in this example. This case is nonlimiting. Furthermore, in the variant of FIG. 4C, the lens 23 has been omitted. In this case, it is the waveguide 25 that may be used for shaping the first beam and/or a corresponding part of the outer lens 6.

Figure 4B:
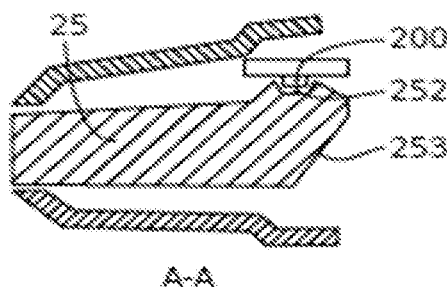
Figure 4C:
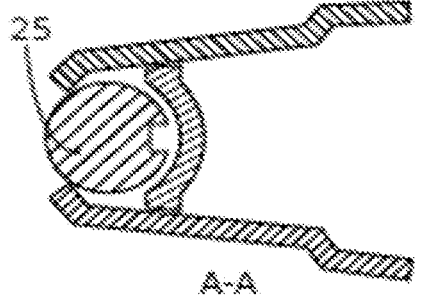

Another shape of the waveguide 25, in an option without the lens 23, is depicted in FIG. 4B. Here, the guide 25 has a flattened shape. It is associated with at least one light source 200. The surface for the entry of the light into the guide 25 may be formed by a coupling cavity 252. As in the case of FIGS. 3A and 3B, a plurality of sources 200 may be spaced apart along the longitudinal dimension of the luminous module 20.

When admitted into the guide 25, the light undergoes total internal reflection toward the exit face of the guide, along the section of the latter. On the opposite section of the guide 25, a reflection surface 253, which is, for example, inclined relative to the upper and lower faces of the guide 25, deflects at least some of the light toward the exit.

Figure 4D:
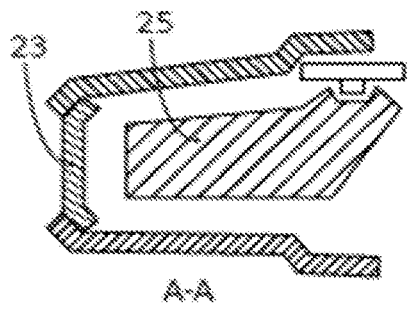

The option of FIG. 4D is fairly similar, but the luminous module 20 is provided with a lens 23.

From the foregoing it is apparent that the refractive optical member of the first device, for shaping the first beam, may be produced in different ways, and notably on at least one of: a waveguide, a lens 23, and the sealing outer lens 6 of the headlamp unit 4.

Furthermore, in these examples, it may be sufficient to modify the design of the outer lens 6 locally in order to form the second device that produces the second beam. This is because the pattern-generating surface(s) 12 can be located on the outer lens 6.

However, these pattern-generating surfaces 12 may be implemented at other locations.

Figure 5A:
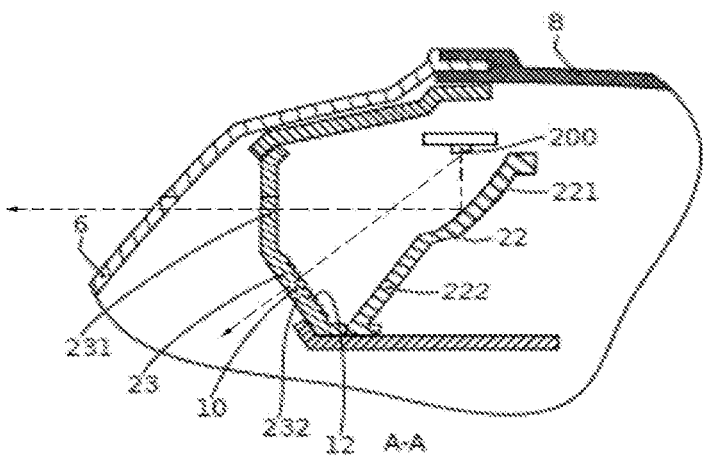
FIG. 5A and FIG. 5B show two variant embodiments of the system of the invention.

In particular, FIG. 5A shows an alternative in which a luminous module 20 incorporates one or more of the generating surfaces 12 on a lens 23. In the configuration of FIG. 5A, as in that of FIG. 3A, at least one luminous source 200 emits light rays toward a reflector 22. The reflector may have its long dimension along the width of the headlamp unit, as was the case with the reflector of FIG. 2. However, a shorter reflector is also possible.

The reflector comprises, in a section corresponding to an area of the lens 23 in which a pattern-generating surface 12 is present, a first portion 221 for deflecting some of the light rays in a first mean direction, these rays, following further shaping, serving to form the first beam. For example, the first portion 221 has a concave curved profile.

The reflector 22 has a second portion 222 which is located in the lower prolongation of the first portion 221 and which has a primary function of mechanical support.

Advantageously, the reflector 22 comprises, in cross section, the two portions 221, 222 in continuity with each other, and preferably on a single part made in one piece.

According to an option that is not illustrated, the portions 221 and 222 could be made on two separate parts. In this case, it is advantageous for them to be mounted on a common support.

If the length dimension of the reflector is greater than the corresponding dimension of the generating surface 12, then the reflector 22 preferably comprises only the first portion 221, because only the generation of the first beam is required there.

Returning to FIG. 5A, after the reflector 22, the path of the rays runs through a lens 23. A first portion 231 of the lens 23 may be used for the optical processing of the rays intended to form the first beam, thus forming the refractive optical member of the first device. As before, the shaping may depend on the intended signaling function.

The lens 23 further comprises, at least in an area comprising a generating surface 12, a second portion 232 placed on the path of the light rays intended to form the second beam. Preferably, the generating surface(s) 12 are positioned on one of the faces of the second portion 232. The optical element(s) 10 are then produced at this position. Most, or even all, of the light rays for forming the second beam emerge directly from the light source 200, although some of them may be produced by reflection from the surface 222.

As in the case shown in FIG. 2, the generating surface 12 may cover, not the whole length of the lens 23, but only one or more localized portions thereof, in a similar manner to what was proposed in FIG. 2 for the provision of surfaces 12 on the outer lens 6. The second beam(s) are produced only when the light passes through a generating surface 12, the rest of the light possibly serving to form the first beam, or being lost, for example due to an obstacle such as a mask.

As an alternative to the representation given in FIG. 5A, it is not essential for the portions 231, 232 to be formed in a single lens 23 made in one piece. Notably, they may be formed with separate pieces; in the latter case, they are advantageously mounted on the same support.

Preferably, the first and second portions 231, 232 have no collinear profiles; in this case, they have an angulation, as shown in FIG. 5A, such that the light rays are oriented differently.

Figure 5B:
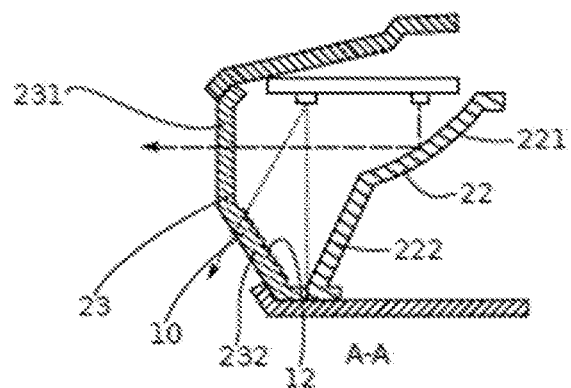

FIG. 5B provides an alternative similar to that of the preceding case, with two light sources 200, preferably positioned on the same support, and spaced apart along a direction perpendicular to the longitudinal direction of the luminous module.

Thus the two sources 200 in question are juxtaposed, one being placed farther to the rear of the luminous module 20, and the other farther forward. Evidently, such a pair of sources 200 may be repeated along the longitudinal dimension of the luminous module 20. More than two sources 200 may also be juxtaposed in this manner. Such a solution provides a finer distribution of the light for forming the first beam and the second beam. This is because one of the sources 200 may produce most of the light for forming the first beam, while a second of the sources 200 may produce most of the light for forming the second beam.

Other embodiments may be seen in FIGS. 6A to 6D.

Thus, in the four cases shown, the optical element 10 is produced by forming a generating surface 12 on the reflector 22.

Figure 6A:
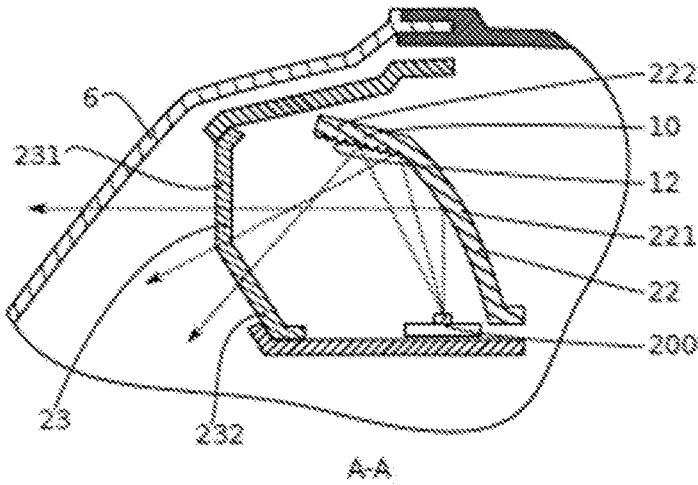
FIG. 6A, FIG. 6B, FIG. 6C and FIG. 6D show four other variant embodiments of the system of the invention.

In the case of FIG. 6A, the operation is fairly similar to that shown in FIG. 5A, for example. At least one light source 200 irradiates a reflector 22, which is configured so that some of the rays are directed to an exit portion to form at least part of the first beam, while some other rays are directed to another exit portion, to form the second beam at the locations where generating surfaces 12 are present. More precisely, in the case shown, the reflector 22 further comprises a first portion 221 and a second portion 222. The previous remarks, notably those referring to FIGS. 5A and 5B regarding the possibilities for producing these portions, are applicable.

Similarly, the luminous module 20 comprises a lens 23, concerning which the information given with reference to FIGS. 5A and 5B may be consulted.

However, in FIG. 6A, the generating surface 12 is positioned on the reflector 22, and more precisely in the second portion 222 thereof. Consequently, it is at this location that the optical element 10 is produced, in reflective form on this occasion. As in the preceding cases, the generating surface 12 is located along the length of the reflector 22. Reference may be made to FIG. 2 for the localized production of a generating surface 12, or of a plurality of surfaces, along the reflector 22.

Figure 6B:
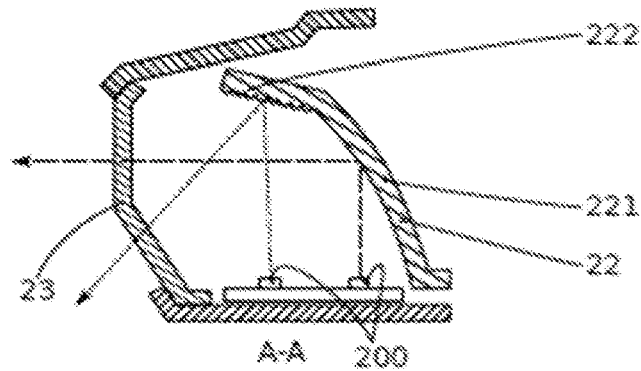

FIG. 6B provides an alternative to FIG. 6A, with a pair of sources 200 placed on a common support, the mean direction of emission of one of the sources targeting the first portion 221, while the mean direction of emission of the other source targets the second portion 222. As before, at least a part of the lens 23 serves to form the refractive optical member for shaping the first beam.

Figure 6C:
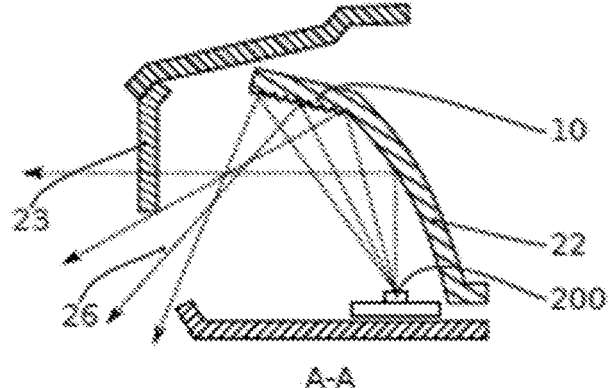
Figure 6D:
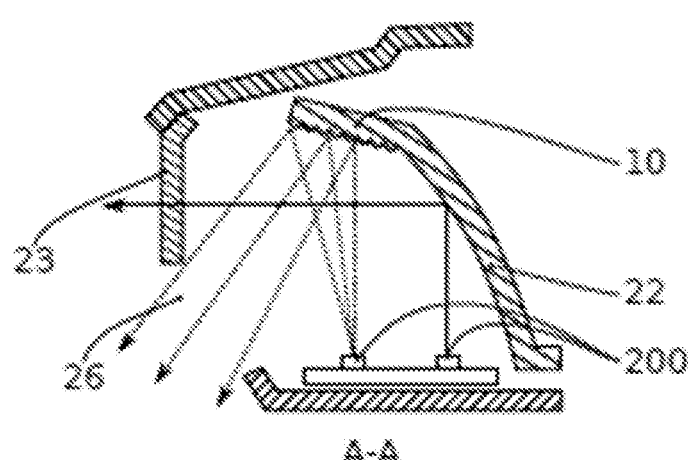

The variants of FIG. 6C and FIG. 6D are similar to FIGS. 6A and 6B respectively. In simple terms, the lens 23 comprises only one portion 221, by means of which the first beam is generated, or comprises at least one or more openings forming passages 26 for the light intended to form the second beam. After processing by the generating surface 12, the rays from the light source(s) 200 for forming the second beam thus follow a lens-free path 23 along a passage 26 corresponding to propagation in air at this location.

As in the case of FIGS. 5A and 5B, the arrangement shown may correspond only to the configuration of the luminous module 20 in an area where a generating surface 12 is present. Outside this area, all the light may be used for the first beam, or some may be lost, notably as a result of masking certain areas of the lens.

In one embodiment, not shown, the first device comprises at least one source belonging to it, and the second device comprises at least another source belonging to it.

Thus, in general terms, the system of the invention may take a form featuring a high degree of sharing, extending, for example, to the sharing of the light source(s), a reflector and/or a waveguide and/or at least one lens. Conversely, it may take a separate form as regards at least one component, notably chosen from among the light source(s), a reflector and/or a waveguide and/or at least one lens. In the latter case, it is still desirable for at least some of the components of the two devices to share the same support. If required, the first device may be organized in the form of a first luminous module, and the second device may be organized in the form of a second luminous module, both luminous modules being mounted on a common support.

Examples of embodiment of the optical element provided with a pattern-generating surface in the form of a caustic-generating surface are given below, with particular reference to FIGS. 7 to 14F.

This is because one aspect of the invention relates to the use of caustics for forming patterns for the purposes of visual indication on a projection surface such as a ground. In general terms, caustics are an optical phenomenon due to the formation of patterns that form an overall mesh of more concentrated lines of light with darker interstitial areas. Thus, depending on the local variations encountered, the rays are deflected in different ways, some towards each other to form the more concentrated, and hence more luminous, lines, while others are deflected away from each other and form the dark areas.

Such a pattern may be propagated and may have an identifiable shape, usually over a working range extending upstream of, and at least as far as, a finite given optimal propagation distance, the propagated pattern corresponding to a distorted projection of an object pattern. "Identifiable" is taken to mean that the pattern is recognized as that which would be observed at the optimal distance; thus the projection of the pattern by the second light beam is operational when the pattern is identifiable. The best result is observed when the targeted surface is located at a distance substantially equal to the optimal distance.

In this application, "smooth" is taken to mean an area that is derivable at any point, in other words an area having no projecting or re-entrant edge. A portion is smooth if all the points forming it conform to this definition.

Thus it is possible to use means for generating the second beam, comprising notably at least one light source and a set of one or more optical elements, to generate rays according to a given distribution, this arrangement being produced in such a way that the rays strike the optical element. The illumination of the second light beam will therefore allow the generation of the propagated pattern, which will be propagated until it encounters a surface, particularly the target surface on which the vehicle moves.

The projection of the propagated pattern on the targeted surface forms the target pattern.

This pattern is also propagated up to a finite given distance, namely over the working range comprising the distance where the sharpness is optimal, that is to say the optimal propagation distance, which allows a certain amount of freedom regarding the distance between the optical element and the target surface. This optimal propagation distance, referred to hereafter as the optimal distance, is the distance at which most of the deflected rays forming the target pattern cross over each other, and therefore the distance at which this pattern is sharpest. It is thus easy to design the generating surface with reference to this definition, especially since the distance between the system of the invention and the surface on which the pattern is to be projected will usually be predetermined.

Figure 7:
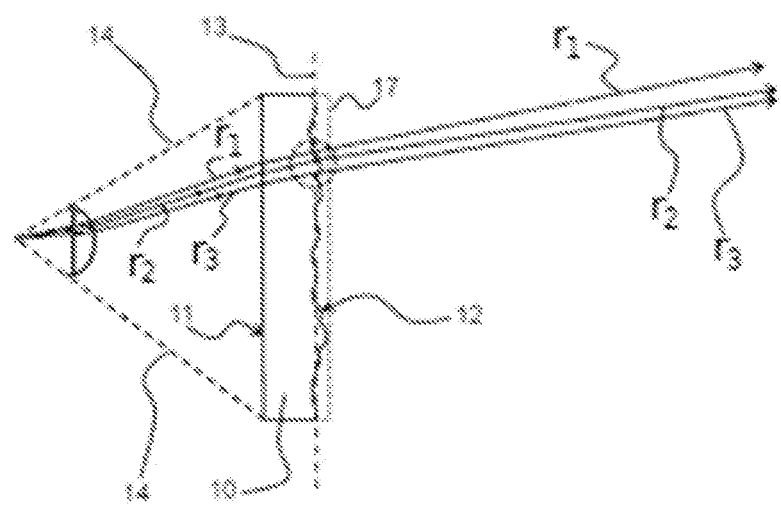
FIG. 7 is a schematic view of an option for forming a second beam by means of a caustic generating surface.
Figure 8:
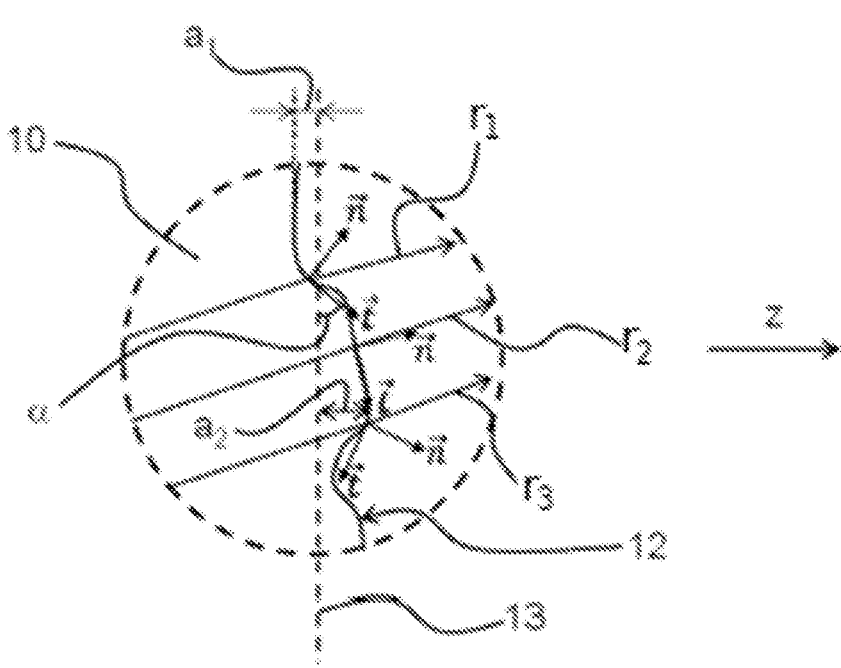
FIG. 8 is an enlarged view of a portion of FIG. 7.

FIG. 7 and FIG. 8 illustrate the general principle of using caustics in the invention.

According to the invention, the optical element 10 has a controlled caustic-generating surface 12. This generating surface 12 may be a reflective surface or a refracting surface, as shown in FIGS. 1 and 2. This optical element is also referred to below as a caustic generator.

The generating surface 12 extends in a given overall shape 13, represented by the vertical broken line in FIGS. 1 and 2.

More particularly, in the embodiment of FIG. 7, the optical element 10 is a transparent plate having an entry face 11 and an exit face. The entry face 11 is arranged facing an assembly (at least one light source and advantageously one of the solutions indicated above with reference to FIGS. 1 to 6D) producing an upstream beam 14 composed of light rays such as the rays r1, r2, r3 shown. The exit face is arranged so as to receive the rays r1, r2, r3 refracted by the entry face 11.

As in the illustrated example, the exit face may be formed, notably entirely, by the generating surface 12.

In general terms, the generating surface 12 has local variations of shape around the given overall shape 13. These local variations are distributed over the whole of the generating surface 12 so that they produce a relief forming an object pattern on the whole of the generating surface 12.

For example, these local variations form hollows and bumps on the exit face of said caustic generator 10.

In general terms, these different local variations are arranged so that most of said generating surface 12 is smooth. Thus, for most of the generating surface 12, this surface is derivable at any point. In other words, it has no projecting or re-entrant edge in the smooth areas.

In general terms, these different local variations are arranged so that, for the beam of rays r1, r2, r3 incident on the whole of said generating surface 12, these rays r1, r2, r3 having a known given distribution, the generating surface 12 deflects the rays r1, r2, r3 in different orientations according to the local variations that they encounter, thus forming a deflected beam propagating a luminous pattern over a working range extending upstream of, and at least as far as, a finite given optimal propagation distance, this propagated pattern corresponding to a distorted projection of the object pattern.

This generating surface 12, with its local variations, corresponds to a control caustic generating surface.

This is because these local variations create local convergences and divergences of the rays. Since these variations are local, most of the rays move away from or toward each other without intersecting before a certain distance. Thus, just as a surface of a swimming pool through which the sun's rays pass creates a luminous pattern propagated and projected on the bottom of a swimming pool, the generating surface 12 creates a luminous pattern which is propagated, i.e. the propagated pattern, which may be projected on the ground.

In the case of a controlled caustic generating surface such as that according to the invention, the luminous pattern is propagated at least over a given optimal distance, depending on the local variations. Beyond this optimal distance Dp, the rays of the deflected beam intersect. The second device, generating the second beam, is therefore placed in such a way that the surface on which the pattern is to be projected is at a distance that makes the pattern identifiable, within the appropriate range of distances detailed in FIG. 10.

Figure 10:
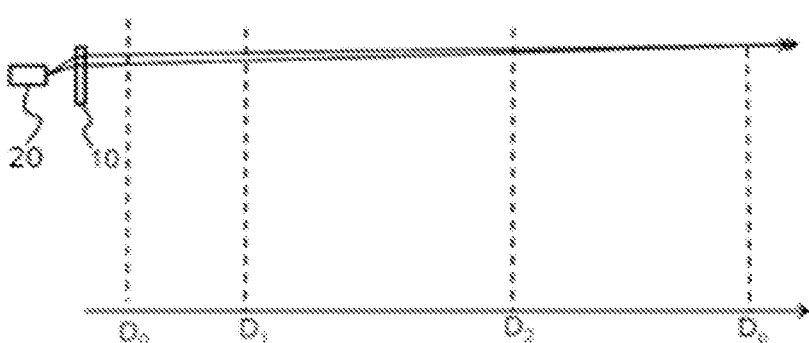
FIG. 10 shows schematically the propagation of a target pattern from a second device.

In the context of the invention, and as may be observed in the schematic diagram of FIG. 10, the optimal distance Dp is finite. If a screen is interposed at an intermediate distance D1 or at another intermediate distance D2, which are smaller than the optimal distance Dp, the same pattern will be observed with more or less distortion.

It should be noted that this optimal distance Dp is that at which the pattern will have the best sharpness. The generating surface can thus be designed with reference to this definition.

There may also be a minimum distance D0 below which the pattern is not formed. This minimum distance D0 is usually fairly small. This minimum distance D0 may be several centimeters, or even several millimeters, which is generally feasible in the intended application.

Furthermore, the pattern is not lost as soon as the rays intersect, but afterwards, at a maximum distance (not shown) which is greater. However, it is easier to design the generating surface with reference to the intersection distance of the rays, which is defined more precisely than the distance at which the pattern is considered to be lost. In the present application, this ray intersection distance is therefore called the optimal propagation distance or the optimal distance.

In other words, the working range comprises a downstream portion, from the optimal distance Dp to this maximum distance, and an upstream portion, from the minimum distance DO to the optimal distance Dp. A pattern that is identifiable at the optimal distance Dp, at the location on the projection surface, remains identifiable within these upstream and downstream portions.

As a general rule in the invention, this downstream portion may have a different value from that of the upstream portion. Notably, it may be less than half its size.

For example, in a luminous module with a diffusing portion of the sealing outer lens 6, with an outer lens Dp of 20 cm, a minimum distance D0 of 1 cm, the value of the upstream portion would be 19 cm, and the downstream portion could be less than 9.5 cm.

In particular, the optical element 10 and its local variations are arranged so that the propagated pattern is projected on a target surface which forms the screen, to form a luminous pattern, called the target pattern, thereon. This target surface is visible from outside the luminous device 1 and is located at a distance that lies within the working range. The target surface may be approximately at the optimal distance Dp, which improves the sharpness. The target surface corresponds to the surface on which the vehicle moves, notably a portion of the roadway.

As a general rule, for the purpose of manufacturing the generating surface 12, this surface is notably calculated by taking into account the target pattern to be displayed, the shape of the target surface and its arrangement relative to the light rays forming the target pattern, and the given distribution of the rays r1, r2, r3 on emission by the beam generator 3, particularly their incidence on said caustic generator 10.

Figure 9:
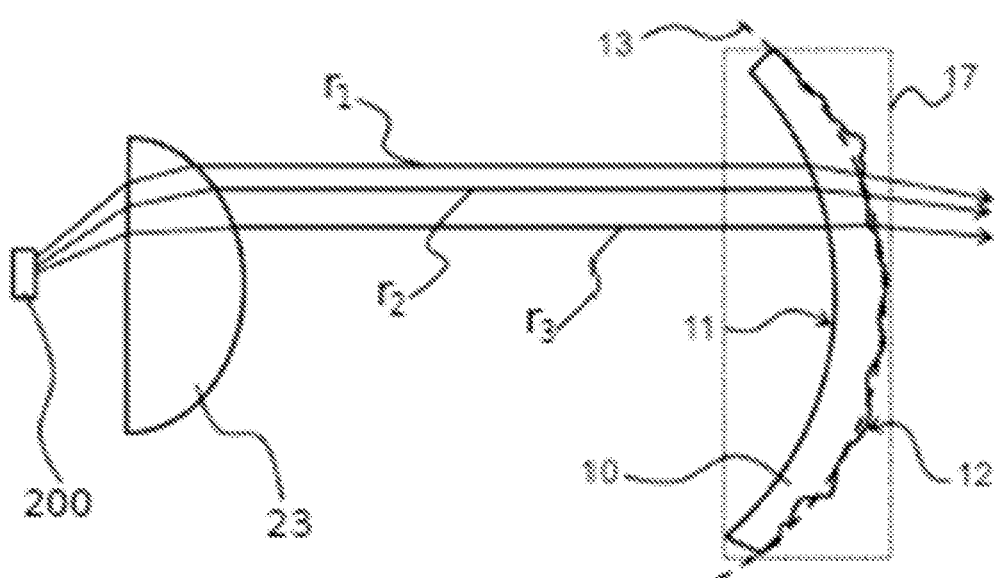
FIG. 9 is a schematic view of another option for implementing a caustic generating surface for the second beam.

According to the invention, the given distribution may correspond to the rays r1, r2, r3 that are substantially parallel, as shown in FIGS. 7 to 9, or substantially generally distributed in an emission cone 14, notably as with a divergent light source such as an LED. This makes it simpler to determine the angle of incidence of the rays on said caustic generator 10, thus simplifying the calculation of the generating surface 12.

For this purpose, it may be considered that the given distribution is such that, for any plane perpendicular to the direction of propagation, at a given point on this plane, the incident ray(s) at this point come from a single direction. This is because the distribution of rays emitted by an LED corresponds substantially to such a given distribution.

To simplify the calculation, the surface may be discretized into numerous elementary surfaces which are considered to resemble the points mentioned in the preceding paragraph.

On the vehicle, the second device producing the second beam with caustics is mounted in such a way that the rays r1, r2, r3 are incident on said generating surface 12.

In particular, the upstream beam 14 is preferably emitted in a given general direction relative to said generating surface 12.

It should be noted that these caustic generating surfaces do not require any great precision in the positioning of the upstream beam 14. The assembly is therefore simplified.

Figure 14A:
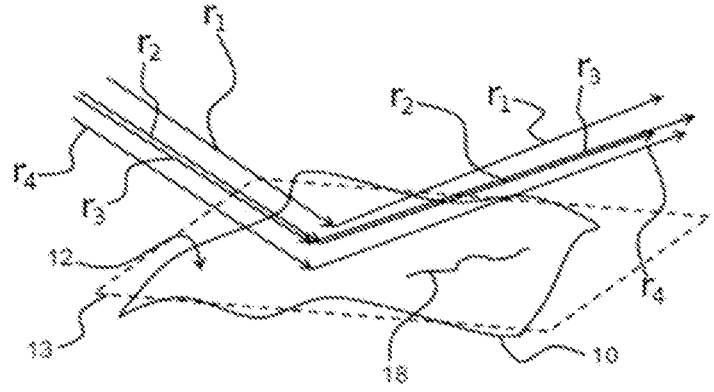
FIG. 14A, FIG. 14B, FIG. 14C, FIG. 14D, FIG. 14E and FIG. 14F show schematically steps of calculation of the generating surface.
Figure 14B:
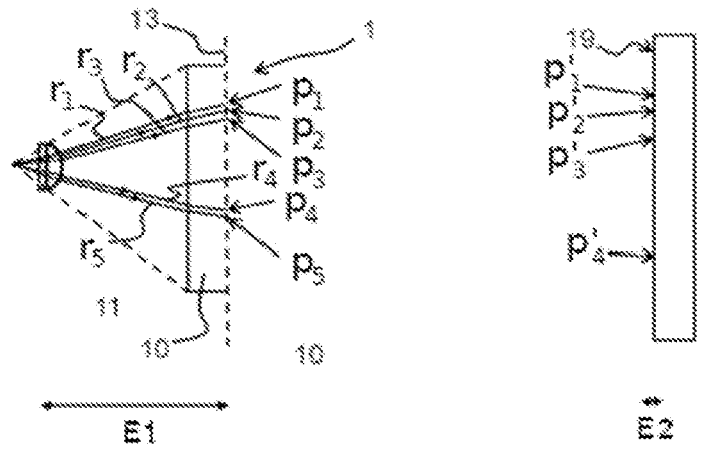

The methods for calculating this generating surface 12 may follow the procedure given below, an example of which is shown in FIGS. 14*a* to 14*f*:

in one step, called the upstream step E1, shown in FIG. 14A, establish the relation defining the angle of incidence of the rays r1, r2, r3, r4, r5 and their distribution at each point of the given overall shape 13, while taking into account the given distribution of the rays r1, r2, r3, in other words while making it possible to define the luminosity of each point in the given overall shape 13 on the optical element 10, called the object point p1, p2, p3, p4, p5;

in a step called the downstream step E2, which may be executed before, after or simultaneously with said upstream step E1, define the light distribution on the target surface enabling the target pattern to be obtained, and therefore define the luminosity of each point on the target surface 19, called the target point p'1, p'2, p'3, p'4, then, in a correlation step E3, shown in FIG. 14B, establish a relation between each object point p1, p2, p3, p4, p5 and each target point p'1, p'2, p'3, p'4, notably in such a way that each target point p'1, p'2, p'3, p'4, receiving light is associated with only one object point p1, p2, p3, p4, p5 or with a set of these points, in order to obtain the requisite luminosity at these points for forming the pattern, then, in a step E4/E5 of orientation of the local variations, shown in FIGS. 14*c* to 14*f*, according to the target points and the object points associated by the relation established in the correlation step E3, determine the orientation of the local variations to be applied to the overall shape so that the rays r1, r2, r3, r4, r5 incident on the object points p1, p2, p3, p4, p5 are deflected so as to have the orientation enabling them to reach the target points p'1, p'2, p'3, p'4 associated by this relation.

The upstream step E1 takes into account the distribution of the rays on their arrival at the given overall shape 13. The simplest case is that of an optical element 10 formed by a transparent plate in which the entry face 11 and the given overall shape 13 of the generating surface 12 are flat, and with a beam generator 3, such as that of FIG. 9, emitting parallel rays.

In this simple case, the upstream beam 14 and the optical element 10 are arranged so that the rays are perpendicular to the entry face 11. Consequently these rays are not deflected before encountering the exit surface on which the generating surface is formed.

The embodiment of FIGS. 7 and 8 and FIGS. 14A to 14F is an intermediate case where the rays are distributed in an initial envelope cone of the beam 14, then refracted by the flat entry face, thus remaining inscribed in a cone, making it easy to determine the angle of incidence of the rays r1, r2, r3, r4, r5 on the overall shape 13, and therefore to determine the angle of incidence of the rays r1, r2, r3, r4, r5 on the generating surface 12.

The embodiment of FIG. 9 is another intermediate case where the distribution of the rays r1, r2, r3 is initially simpler, since they are parallel in the upstream beam at the optical element. However, they are then refracted differently by the entry face 11 because this is curved, being for example cylindrical with a circular or elliptical cross section. However, when this curvature is defined, it may be used to determine the orientation of the rays r1, r2, r3 on their arrival at the given overall shape 13 of the generating surface 12, which is also curved.

In the example shown in FIG. 9, the optical element is a curved transparent plate, in which the entry face 11 and the overall shape 13 of the generating surface 12 are cylindrical.

In order to have parallel rays, the second device may comprise, as in FIG. 9, a light source such as a light-emitting diode and a collimating lens whose diopters enable the rays to be oriented in parallel.

However, more complicated cases may be envisaged, with rays distributed in an emission cone, a curved, notably cylindrical, entry surface, and a generating surface having a curved given overall shape.

Other given distributions of the rays may be envisaged.

Regarding the downstream step E2, the simplest case is when the target surface 19 is flat and perpendicular to the overall direction of emission of the rays on arrival at the overall shape 13 of the generating surface 12 to be calculated. The target pattern then corresponds to the propagated pattern.

In more complex cases, allowance must be made for the orientation of the flat target surface, lying at an angle to the overall direction of emission of the rays on arrival at the generating surface. However, such a determination is still simple. If the target surface is not flat, it is necessary to take its shape into account, notably by defining it with an equation so as to determine the light distribution, in order to be able to observe the target pattern in projection. In all more complex cases, the propagated pattern, if defined on a plane perpendicular to the direction of propagation of the pattern, differs from the target pattern.

Various methods may then be used to execute step E3 for correlating the rays incident on the overall shape 13 of the generating surface 12 with the light distribution on the target surface 19.

As explained above, this correlation step makes it possible to determine which object points p1, p2, p3, p4, p5 of the given overall shape 13 are associated with which target points p'1, p'2, p'3, p'4 of the target surface 19.

As a result of the upstream step E1, the orientation of the rays r1, r2, r3, r4, r5 on arrival at the given overall shape 13 of the generating surface 12 is known. By using the correlation between target points p'1, p'2, p'3, p'4 and object points p1, p2, p3, p4, p5, it is also possible to determine the orientation of the rays r1, r2, r3, r4, r5 leaving this given overall shape 13 to reach the object points p1, p2, p3, p4, p5 at the target points p'1, p'2, p'3, p'4 with which they are correlated.

This enables the orientation step E4/E5 to be executed by calculating the variation to be attributed to the exit surface relative to this given overall shape 13 at every point of the latter, thus allowing the generating surface 12 to be defined.

When this calculation has been performed, it can be observed that the generating surface 12 is at a greater or lesser distance from the given overall shape 13, depending on the amplitudes of the local variations. To refine the calculation of the generating surface 12, the upstream and downstream steps can therefore be reiterated, together with the definition step, by considering the arrival and departure of the rays with respect to the shape of the generating surface obtained previously, rather than with respect to the given overall shape. The precision of this surface, and therefore the sharpness of the image, will be improved as the number of iterations increases. This also enables the generating surface to be smoothed.

To execute the orientation step, Descartes' law, also known as Snell's law or the Snell-Descartes law, may be used.

Figure 14C:
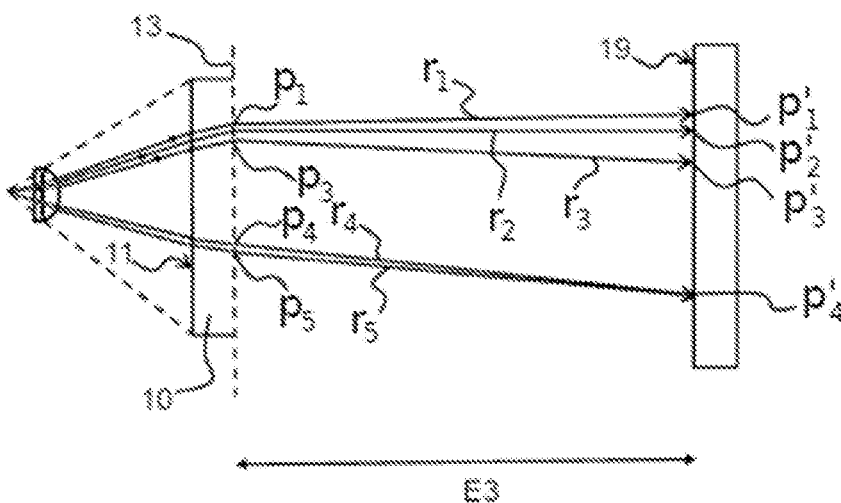
Figure 14D:
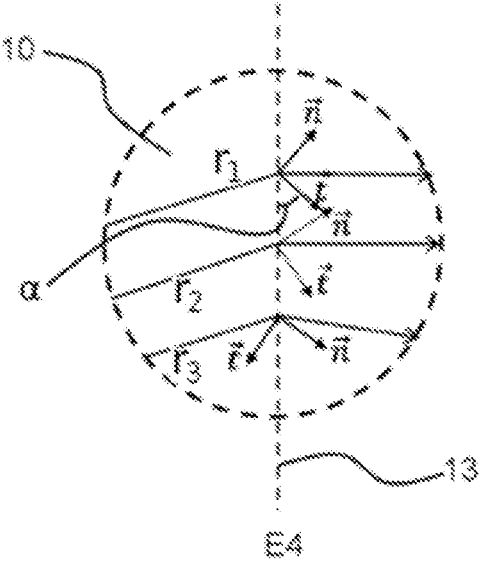
Figure 14E:
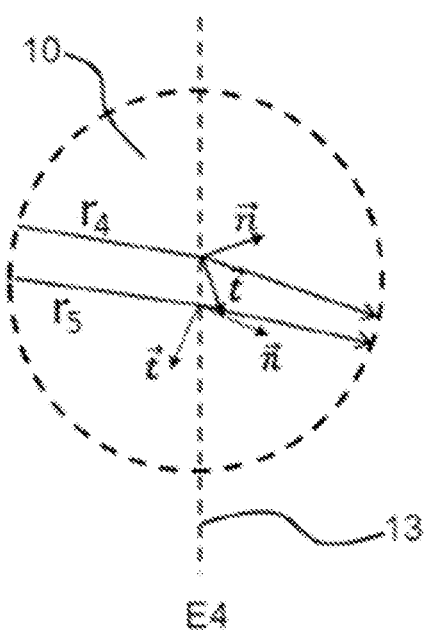

Thus, in a substep E4, shown in FIG. 14C and FIG. 14E, for an object point p1, p2, p3, p4, p5 of the given overall shape 13 or of the previously calculated generating surface, with the direction of arrival and departure of the rays r1, r2, r3, r4, r5, it is possible to determine the tangent t and the normal n to the exit surface at this point, in order that the surface deflects each incident ray r1, r2, r3, r4, r5 on arrival in the corresponding direction of refraction.

Figure 14F:
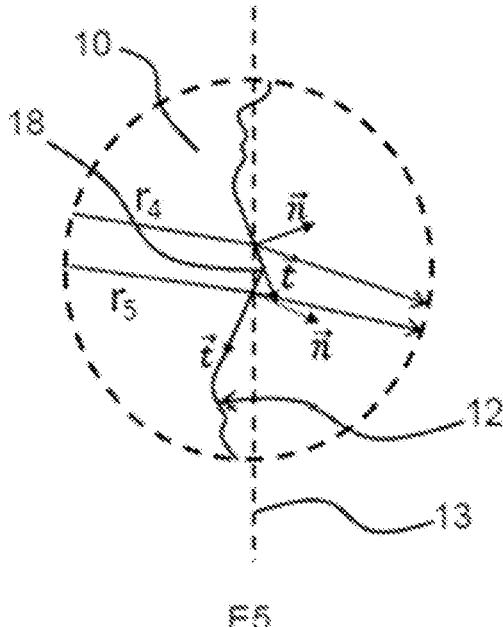

By determining the set of normals n, also called the fields of the normals, the generating surface 12 having these normals is determined in a substep E5 shown in FIG. 14D and FIG. 14F.

FIGS. 14C and 14D show the execution of these two substeps in an enlargement at the object points p1, p2, p3, the references of which are omitted from FIGS. 14C and 14D for reasons of clarity.

FIG. 14E and FIG. 14F show the execution of these two substeps in an enlargement at the object points p4, p5, the references of which are omitted from FIGS. 14E and 14F for reasons of clarity.

FIG. 2 shows the local variations of the generating surface 12 relative to the given overall shape 13, which is flat in this example. These local variations correspond to changes of slope, defined by the normal n and/or the tangent t to the generating surface 12 at the positions of these local variations. Consequently, this generating surface 12 comprises deviations from the overall shape 13, forming hollows and bumps.

For reasons of clarity, the normals n and tangents t are not shown here except at three points on the generating surface 12, but the normal and/or the tangent are calculated for all the points.

In this application, the amplitude of a local variation may be defined as the distance between the local variation and said overall shape 13 along the normal at a given point of the overall shape 13.

If the global shape is flat, as in FIGS. 7 and 8, any point of the given overall shape may be defined by a height in a single direction z perpendicular to this overall shape 13.

FIG. 8 shows a minimum amplitude a1, conventionally taken to be negative because it is located upstream of the generating surface 12, and a maximum amplitude a2, downstream of the generating surface 12, taken to be positive.

It should be noted that, in the illustrated method, the surface may be discretized into numerous elementary surfaces, and these surfaces may be considered to resemble the aforementioned points p1, p2, p3, p4, p5, p'1, p'2, p'3, p'4.

Figure 11:
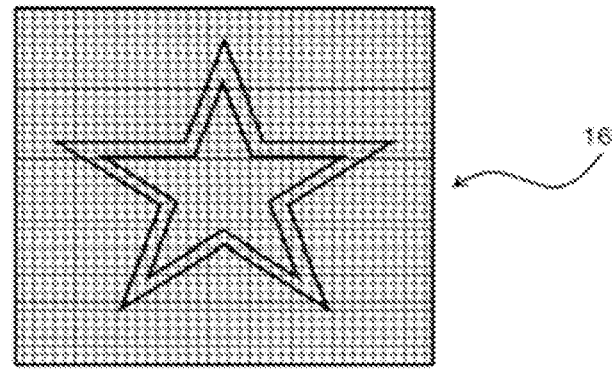
FIG. 11 shows schematically a target pattern formed by the second device.

FIG. 11 shows the propagated pattern 16 as it will be seen on a flat screen, perpendicular to the direction of propagation and at a distance equal to, or close to, the propagation distance. If the target surface is also flat and oriented in the same way, this propagated pattern 16 will also be the target pattern seen in FIG. 11. Otherwise it will be deformed.

Figure 12:
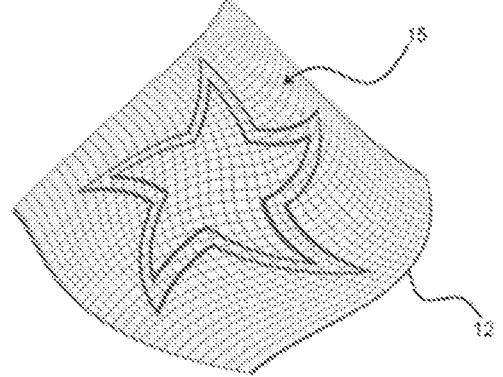
FIG. 12 shows schematically the object pattern of the generating surface for generating the target pattern of FIG. 11.

The generating surface 12 used for forming this propagated pattern 16 is shown in FIG. 12. Because of the reliefs formed on this surface 12, the object pattern 15 formed by this relief, and hence the local variations, can be seen. This object pattern 15, shown schematically in FIG. 12, corresponds to a distorted shape of the propagated pattern 16.

If it is desired that the pattern of FIG. 11 should be the target pattern observed by a driver or a third party observing the roadway, then, since the target pattern is formed by rays oblique to the roadway because they come, for example, from a front headlamp, from a rear lamp or from a direction indicator, the propagated pattern would have to be distorted relative to the target pattern, in order for the star to be observed on the road as it is shown in FIG. 11.

According to the invention, as in FIGS. 7 and 8, the generating surface 12 may be arranged, and therefore calculated, so that, for most of the generating surface 12, that is to say on the smooth portions representing most of this surface, the passage from one local variation to another is smooth. This is notably the case in the portion shown in FIG. 2. In a case in which, for the calculation, the local variations are not considered to be points but as a small area of the generating surface, notably an infinitesimal area, the generating surface 12 may also be arranged in such a way that the local variations are smooth for these smooth portions.

Notably, one of the smooth portions may have a surface representing most of the generating surface.

A first example of a calculating method may be used to calculate this generating surface 12. This is the method disclosed in the document by Yue et al. [1]. This document indicates, notably, the various steps for constructing the generating surface 12 according to a given example, particularly for establishing the relation between the points on the generating surface 12 and those on the target surface.

This first example of a method may be used to obtain a completely flat generating surface 12. The change from one local variation to the other is smooth.

To establish the relation of the correlation step, notably as in this first method, a condition of establishing a one-to-one relation between the object points and the target points is specified. Thus the whole of the generating surface 12 is arranged in such a way that:

each local variation deflects the incident light rays so as to form one and only one portion of the target pattern that is separate from the portions of the target pattern formed by the other local variations, and for the whole target pattern, each portion of the target pattern receives the light rays from one and only one local variation.

This method enables good luminosity gradients and good resolution to be obtained. It can, for example, be used to form the generating surface 12 of FIG. 7.

According to other methods, in order to improve the contrast and have some darker areas and some areas of maximum luminosity, it is possible to arrange the local variations so that the generating surface 12 has one or more edges.

Depending on the case, the generating surface 12 comprises:

at least one edge delimiting portions of the generating surface with different orientations, so as to generate a divergence such that some areas of the target pattern receive almost no rays or none at all, thus forming dark areas, and/or at least one edge delimiting portions of the generating surface with different orientations so as to generate a convergence such that some areas of the target pattern receive the rays from a plurality of local variations and/or from a plurality of portions of this generating surface.

This makes it possible, notably, to produce patterns with very sharp luminous lines or writing.

For this purpose, it is possible, for example, to use a second calculation method to calculate the generating surface 12 disclosed in the document by Schwartzburg et al. [2].

In this second method, no one-to-one relation condition is used in the correlation step. This method is more complex, but may be used to obtain a higher contrast, in other words a higher ratio between the bright and the dark areas. This method enables darker areas to be obtained than those of the aforementioned method of Yue et al. [1]. Thus with this second method it is possible to obtain more pronounced demarcations between the dark and light areas. The portions outside the edges are smooth, the change from one local variation to the other being smooth.

For example, in FIGS. 14A to 14F, the method used specifies no constraint of one-to-one relation for establishing the target pattern. At some locations, a plurality of object points p4, p5 correspond to a single target point p'4. Consequently the generating surface 12 has a discontinuity of slope variation corresponding to an emerging edge 18 on the generating surface 12 and therefore re-entrant toward the incident rays. The local variations on either side of this edge 18 enable the rays r4, r5 to be concentrated on a line of the target surface, for example in order to form a sharp intense line.

Outside this edge 18, notably above and below it, the correlation step E3 has resulted in a one-to-one relation between the corresponding object points p1, p2, p3 and the corresponding target points p'1, p'2, p'3, without specifying this as a constraint.

Regardless of the method used, each point on the generating surface 12 is therefore associated with an amplitude corresponding to a difference in the overall shape 13, this amplitude being defined along a direction parallel to the normal to the overall shape 13 at this point.

For example, as shown in FIGS. 7 and 9, a plane comprising the overall direction of the beam of incident rays is considered. In this plan, we consider the rectangle 17 in which the optical element 10 is circumscribed, this rectangle 17 may have one side at least four times greater, or notably six times greater than that of the amplitude of each local variation relative to the given overall shape 13 at the position of this local variation, and therefore greater than six times the maximum amplitude.

Additionally, the local variations may have a tangent t forming an angle α of between-60 and 60 degrees, or notably between-30 and 30 degrees, with the given overall shape.

By cumulating these conditions of slope and amplitude, optimal results are achieved, notably in terms of contrast and sharpness, allowing, notably, a propagation of the propagated pattern over the working range, particularly at the optimal distance Dp.

It should be noted that, as the size of the light source producing the beam upstream of the optical element 10 decreases relative to the generating surface 12, the projected pattern becomes closer to the desired pattern used for the construction of the generating surface 12. For example, the side of the rectangle 17 in which the optical element 10 is circumscribed may be at least six times, or notably thirty times, greater than a side of this light source, notably if this source is a light-emitting diode.

The two embodiments of FIGS. 7 to 9 show optical elements 10 operating by refraction.

Here, the generating surface 12 is formed on an optical element 10 specially assigned for this purpose. However, it may also be formed on elements having other functions, such as a sealing outer lens 6 of the luminous device, or a member, such as a refractive or reflective optical element of another luminous and/or signaling device of an automotive vehicle (and, particularly advantageously, a member of the first device described above), of the system into which the second luminous device is integrated.

FIGS. 7 to 9 also illustrate cases in which the generating surface 12 is on the exit face of the element 10. However, this is not limiting, and in general terms the optical element may have a generating surface on the entry face and/or on the exit face. The illustrations of FIGS. 2 to 5B provide examples of refractive operation.

The optical element 10 may also operate by reflection, as in the case of FIGS. 6A to 6D. Here, the optical element is a portion of mirror whose reflective surface forms the generating surface 12, having local variations around its flat overall shape. This mirror may have one or more edges. Here, there is a re-entrant edge, that is to say one forming the bottom of a hollow, delimiting portions of surfaces with an orientation relative to each other, these portions thus allowing the creation of an intense luminous line having a particular shape on the target pattern (not shown).

The same construction methods may be applied to this reflective generating surface 12, allowing for the fact, in the various steps, that it is reflection and not refraction that is taking place. In such a case, the upstream step is simplified because the rays r1, r2, r3, r4 arrive directly on the generating surface 12 according to the given distribution and depart from it equally directly.

Figure 13:
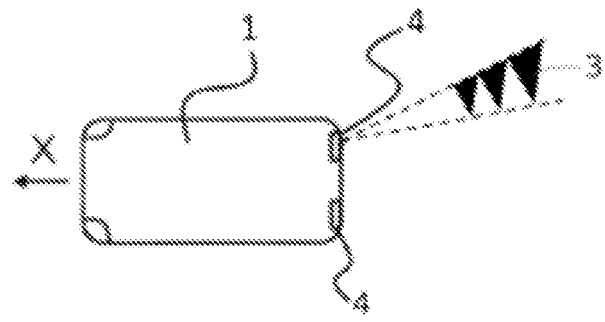
FIG. 13 shows another implementation example of the system of the invention.

FIG. 13 illustrates another example of a lighting system according to the invention. In the case illustrated, a vehicle 1 with a longitudinal axis X is equipped with two lighting systems according to the invention, which are here integrated in the right reversing light unit 4 and the left reversing light unit 4, respectively.

For example, these units 4 each comprise a housing and a sealing outer lens for the corresponding housing, as shown before in FIG. 2. Each sealing outer lens comprises a portion whose diopter between the outer lens and the exterior forms the generating surface. Each of these generating surfaces receives some of the light rays from a corresponding rear lamp light source. It would also be possible to provide a light source specially assigned for this generating surface.

The generating surface of each unit 4 is arranged to generate a target pattern 3 on the road, forming a pattern composed of three triangles, here indicating to the following vehicles a change of direction toward the right, relative to the direction of movement of the vehicle shown by the arrow X.

According to an option in which the signaling function of the first device is an indication of reversing, the pattern may comprise a straight strip to assist with marking the overall dimensions of the vehicle, for example for the purpose of maneuvering in reverse, so as to assist the driver.

Since FIG. 13 is an overhead view, the pattern is stretched, but will be perceived as less stretched by the following vehicles. The object pattern (not shown) formed by the relief of the corresponding generating surface has a distorted form of this target pattern composed of a set of three triangles.

In this example, evidently, according to the direction of propagation, the distance of the pattern between the generating surface and the target surface, that is to say the road, will vary according to the attitude of the vehicle 1, for example whether or not it is loaded. Here, the generating surface is arranged so that, when the attitude of the vehicle 1 is horizontal on a horizontal road, the given optimal distance Dp is greater than, for example twice as much as, the distance between the generating surface and the road in the direction of propagation of the propagated pattern. This enables a visible sharp target pattern to be provided regardless of the orientation, notably the attitude, of the vehicle 1. The target pattern is therefore visible while driving uphill or downhill, during braking or acceleration, regardless of the load of the vehicle.

The invention is not limited to the embodiments described above and extends to all the embodiments covered by the claims.

LIST OF REFERENCES CITED

[1] Yonghao Yue, Kei Iwasaki, Bing-Yu Chen, Yoshinori Dobashi, Tomoyuki Nishita. Poisson-Based Continuous Surface Generation for Goal-Based Caustics, ACM Transactions on Graphics, Vol. 31, No. 3, Article 31 (May 2014).

[2] Yuliy Schwartzburg, Romain Testuz, Andrea Tagliasacchi, Mark Pauly. High-contrast Computational Caustic Design, ACM Transactions on Graphics (Proceedings of ACM SIGGRAPH 2014), Vol. 33, Issue 4, Article No. 74 (July 2014).

What is claimed is:

1. A system for projecting light beams for a vehicle, comprising a first device configured to generate a first beam which performs a signaling function and a second device configured to generate at least a second beam for projecting a pattern with a plurality of portions spaced apart from each other, with the first device including at least one refractive optical member for shaping the first beam, and in that the second device includes at least one optical element having a controlled pattern-generating surface configured to deflect light rays from a light source, the generating surface having local variations arranged so as to form a predetermined pattern in the second beam, wherein the first device and the second device include at least one common dioptric optical element that includes the controlled pattern-generating surface, with the at least one common dioptric optical element being a lens or an outer lens sealing a headlamp unit.

2. The system as claimed in claim 1, wherein the generating surface is a reflective or refractive surface, extending in a given overall shape and having local variations of shape around this given overall shape, these local variations being distributed over the whole of the generating surface so that they provide the whole of the generating surface with a relief forming an object pattern, though these different local variations are arranged over the whole of the generating surface, they are limited so that most of the generating surface is smooth and so that, for a beam of rays incident on the whole of the generating surface to form a given distribution, the generating surface deflects the rays in different orientations according to the local variations that they encounter, thus forming a deflected beam propagating a propagated pattern identifiable over a working range extending upstream of and at least as far as a finite given optimal propagation distance, the propagated pattern corresponding to a distorted projection of the object pattern, the optical element being arranged so that the propagated pattern is projected on a target surface which is visible from the outside of the system and which is located within the working range and/or at a distance substantially equal to the optimal distance.

3. The system as claimed in claim 1, wherein the first device and the second device have at least one common light source.

4. The system as claimed in claim 1, wherein the at least one common dioptric optical element includes a waveguide.

5. The system as claimed in claim 1, wherein the at least one common optical element includes a reflector.

6. The system as claimed in claim 1, wherein the at least one common optical element includes a dioptric optical element forming the refractive optical member for shaping the first beam.

7. The system as claimed in claim 1, wherein the second device includes a plurality of optical elements each having a generating surface.

8. The system as claimed in claim 7, wherein the optical elements each having a generating surface are spaced apart along a long dimension of a common optical element.

9. The system as claimed in claim 1, wherein the signaling function is chosen from among a change of direction indication, a reversing indication, a braking indication and a hazard light indication.

10. A system for projecting light beams for a vehicle, comprising a first device configured to generate a first beam which performs a signaling function and a second device configured to generate at least a second beam for projecting a pattern, with the first device including at least one refractive optical member for shaping the first beam, and in that the second device includes at least one optical element having a controlled pattern-generating surface configured to deflect light rays from a light source, the generating surface having local variations arranged so as to form a predetermined pattern in the second beam, wherein the first device and the second device include at least one common optical element with the at least one common optical element being a waveguide.

11. A system for projecting light beams for a vehicle, comprising a first device configured to generate a first beam which performs a signaling function and a second device configured to generate at least a second beam for projecting a pattern, with the first device including at least one refractive optical member for shaping the first beam, and in that the second device includes at least one optical element having a controlled pattern-generating surface configured to deflect light rays from a light source, the generating surface having local variations arranged so as to form a predetermined pattern in the second beam, wherein the second device includes a plurality of optical elements each having a generating surface that are spaced apart along a long dimension of a common optical element.

* * * * *